United States Patent [19]
Löffel et al.

[11] Patent Number: 5,557,545
[45] Date of Patent: Sep. 17, 1996

[54] AUTOMATIC CONTROL FOR A POWER PLANT

[75] Inventors: Fritz Löffel, Erlangen; Claudius Arnoldt, Hessdorf, both of Germany

[73] Assignee: Siemens Aktiengesellschaft, Munich, Germany

[21] Appl. No.: 227,597

[22] Filed: Apr. 14, 1994

Related U.S. Application Data

[63] Continuation of PCT/DE92/00838, Oct. 1, 1992.

[30] Foreign Application Priority Data

Oct. 14, 1991 [DE] Germany ............ 41 33 980.0

[51] Int. Cl.$^6$ ............ G05R 19/418; G05R 19/4155
[52] U.S. Cl. ............ 364/550; 364/131; 364/138; 364/492
[58] Field of Search ............ 364/131, 132, 364/138, 146, 148, 550, 551.01, 492

[56] References Cited

U.S. PATENT DOCUMENTS

| | | | |
|---|---|---|---|
| 3,324,458 | 6/1967 | MacArthur | 364/551.01 X |
| 3,971,000 | 7/1976 | Cromwell | 364/138 X |
| 4,074,354 | 2/1978 | Nakagawa et al. | 364/188 X |
| 4,124,887 | 11/1978 | Johnson et al. | 364/138 |
| 4,253,148 | 2/1981 | Johnson et al. | 364/133 |
| 4,304,001 | 12/1981 | Cope | 395/182.02 |
| 4,346,446 | 8/1982 | Erbstein et al. | 364/551.01 |
| 4,352,103 | 9/1982 | Slater | 395/182.02 |
| 4,517,637 | 5/1985 | Cassell | 364/138 |
| 4,835,699 | 5/1989 | Mallard | 364/188 X |
| 4,872,106 | 10/1989 | Slater | 395/182.11 |
| 5,220,517 | 6/1993 | Sierk et al. | 364/550 |
| 5,249,140 | 9/1993 | Kessler | 364/551.01 |
| 5,371,859 | 12/1994 | Lennartsson | 364/132 X |

FOREIGN PATENT DOCUMENTS

| | | |
|---|---|---|
| 0235656 | 2/1986 | European Pat. Off. . |
| 0242609 | 10/1987 | European Pat. Off. . |
| 0413044 | 2/1991 | European Pat. Off. . |
| 4135803 | 5/1992 | Germany . |

OTHER PUBLICATIONS

IEEE Transactions on Energy Conversion, vol. 3, No. 3 Sep. 1988 (Iioka et al.) pp. 548–553.

Regelungstechnische Praxis, vol. 24, Jun. 1982, No. 6 München, Germany, pp. 187–191.

*Primary Examiner*—Edward R. Cosimano
*Attorney, Agent, or Firm*—Herbert L. Lerner; Laurence A. Greenberg

[57] ABSTRACT

An automatic control for a power plant having a plurality of mutually interacting plant components includes an automation system shared by the plant components having automation devices executing various functions. The automation devices are connected to one another and to a master control unit through a data bus which transmits plant-relevant data. According to the invention the automation devices are combined in a manner corresponding to the technological structure of the plant to form mutually independently functional units. Each functional unit corresponds to a function chain which includes a plurality of subfunction devices. Each subfunction device includes a plurality of subsystems with controllable plant components.

4 Claims, 2 Drawing Sheets

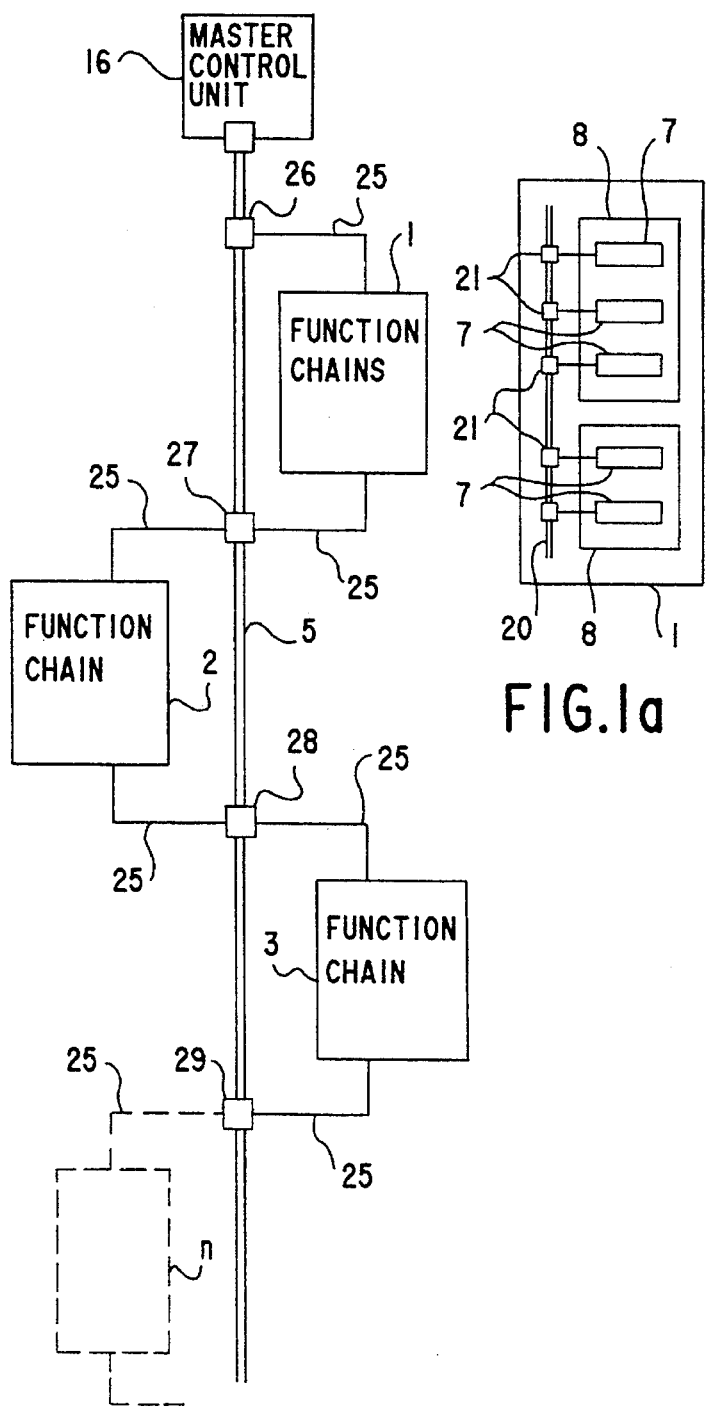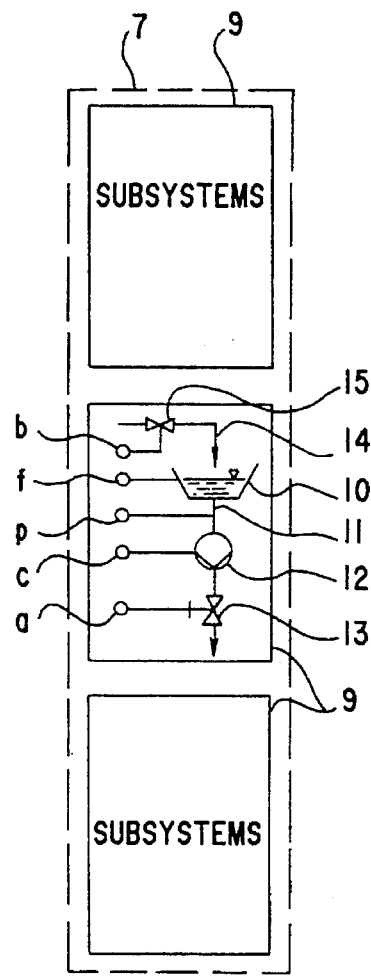
FIG.1a
FIG.1b
FIG.1

AUTOMATIC CONTROL FOR A POWER PLANT

CROSS-REFERENCE TO RELATED APPLICATION

This application is a Continuation of International Application Serial No. PCT/DE92/00838, filed Oct. 1, 1992.

BACKGROUND OF THE INVENTION

1. Field of the Invention

The invention relates to an automatic control for a power plant having a plurality of mutually interacting plant components, automation devices executing various functions in an automation system shared by the plant components, and a data bus connecting the automation devices to one another and to a master control unit and transmitting plant-relevant data.

In the case of master control engineering for a power plant having various plant components which is known from Published European Application No. 0 242 609 A1, a multiplicity of functions to be controlled individually or interactively by open-loop and closed-loop control are executed partially or fully automatically by a common automation system. The automation system includes a number of automation devices, which communicate with one another and with a master control unit through a common data bus. The automation devices may be assembled both from freely programmable and from stored-program processors and in each case control and monitor a plurality of component groups or subsystems of the individual plant components.

In the operation of a power plant, great quantities of data are moved through the data bus in the form of control commands and status messages as well as fault messages, which are triggered in the master control unit by control interventions or are rendered visible on screens or other visual display units. In particular during start-up and shut-down of the plant, that necessitates a multiplicity of control interventions, which as a consequence have a correspondingly large number of check-back signals to be noted. That results in a not inconsiderable strain on the operating personnel.

2. Summary of the Invention

It is accordingly an object of the invention to provide an automatic control for a power plant, which overcomes the hereinafore-mentioned disadvantages of the heretofore-known devices of this general type, which is simplified to the greatest extent and which ensures safe controlling and monitoring of the plant without overtaxing the operating personnel in all operating phases, that is to say even when starting up and shutting down the plant as well as in the case of an irregularity or a fault of the process sequence.

With the foregoing and other objects in view there is provided, in accordance with the invention, in a power plant having a plurality of mutually interacting controllable plant components, an automatic control, comprising a master control unit; a data bus connected to the master control unit; and function chains including automation devices each having a plurality of subfunction devices, the automation devices being combined into mutually independent functional units corresponding to a technological structure of the plant, the automation devices executing various functions in an automation system shared by the plant components, and the automation devices being connected to one another and to the master control unit by the data bus for transmitting data relevant to the power plant; the function chains each including a common data line linking the subfunction devices and transmitting only data relevant for one functional unit; and each of the subfunction devices including a plurality of subsystems having the controllable plant components.

The various functional units, which are realized by the function chains in terms of functional engineering, are media and energy transport sequences between process-engineering holding or conversion points taking place within logical process sections.

In accordance with another feature of the invention, the function chains are expediently linked during the start-up operation and the shut-down operation of the plant in a predetermined sequence. In this case, the automation devices of the various function chains communicate with one another, so that in process-engineering terms the individual functional units are only activated when the higher-level units are made ready. In the meantime, during the operation of the plant, function chains are individually activatable.

In accordance with a further feature of the invention, for this purpose, the function chains are linked to one another and to the data bus through data lines by data-selectively acting coupling elements.

Within a function chain, relevant data are advantageously transferred only for a functional unit. For this purpose, the subfunction devices within a function chain are linked through a common data line.

The overall process of the plant can advantageously be controlled by only six function chains. In accordance with a concomitant feature of the invention, these six function chains are hierarchically organized in a manner corresponding to the logical process sequence of the plant in the following sequence: supply, disposal, transport of waste process heat and return transport of condensate, transport of process heat, conversion of primary energy into thermal energy, and conversion of the thermal energy into electrical energy.

The advantages attained with the invention are in particular that due to dividing up the overall process of a power plant into just a few logical process sections, which in each case represent a functional unit, and due to a corresponding breaking down of the functions required therefor into function chains, a high degree of automation with an extremely high condensing of information into just a few status messages to be noted is achieved. As a result, the overall process of a power plant can be controlled and monitored by just one person in every operating phase.

Other features which are considered as characteristic for the invention are set forth in the appended claims.

Although the invention is illustrated and described herein as embodied in an automatic control for a power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram showing an automation structure of a power plant having a plurality of function chains;

FIG. 1a is a block circuit diagram showing details of a function chain of FIG. 1;

FIG. 1b is a block circuit diagram showing details of a of FIG. 1a; and

DESCRIPTION OF THE PREFERRED EMBODIMENTS

Figure 2:
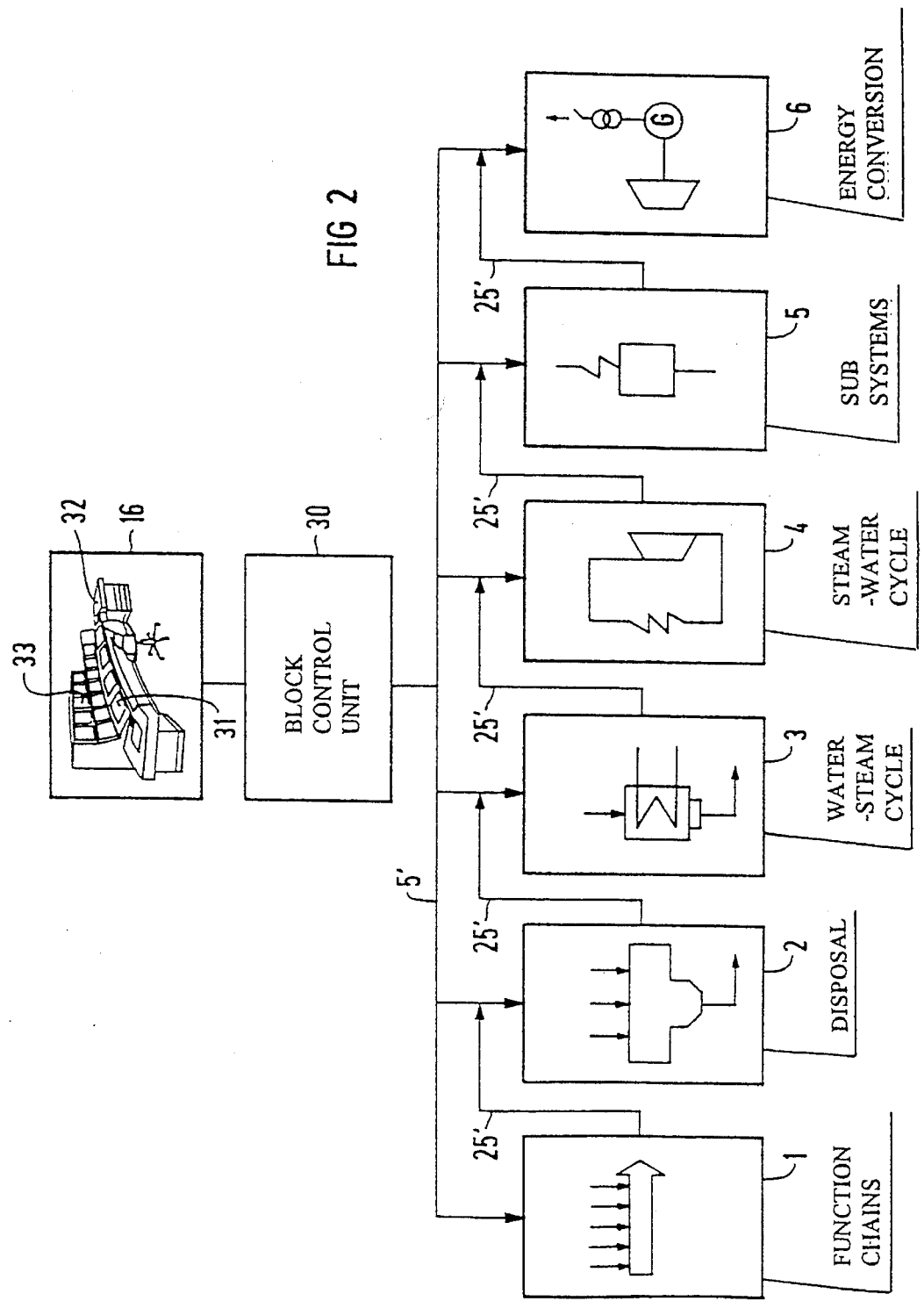
FIG. 2 is a signal flow diagram of an automatic control of a power plant process having six functional units.

Referring now to the figures of the drawing in detail and first, particularly, to FIG. 1 thereof, there is seen a number of function chains 1 to n, which are connected to one another and to a master control unit 16 through a common data bus 5. If the power plant has a plurality of blocks, the function chains are connected to a block control assigned to the master control unit 16.

As is shown by the example of the function chain 1 in FIG. 1a, the individual function chains 1 to n include a plurality of subfunction devices 7 which, for example, are executed by two automation devices 8.

As is seen in FIG. 1b, each subfunction device 7 is assigned subsystems 9 of individual plant components, for example of a boiler, a turbine group or a condenser. One subsystem 9 in this case is a liquid tank 10, to which a line 11 with a pump 12 and a valve 13 is connected. The tank 10 may be supplied with liquid through line 14 with a valve 15. In this subsystem 9, the subfunction device 7 includes an automatic control of the valves 13 and 15 as well as of the pump 12, which is symbolized by respective control signals a, b and c, and by parameters f and p which are to be controlled and monitored in a partially interacting manner and in this case are the respective filling level of the tank 10 and the pressure in the line 11.

The subfunction devices 7 of the function chain 1 are linked to one another through a data line or a data bus 20 by interfaces 21. Within the function chain 1, preferably only data which are relevant for an associated functional unit are transmitted.

During the start up of the power station or plant, the functional units, which are represented by the function chains 1 to n, are successively activated and held in activation by a control command. For this purpose, the automation devices 8 assigned to the function chains 1 to n are linked to one another and to the data bus 5 through data lines 25 and data-selectively acting coupling elements 26 to 29, such as intelligent bridges. The coupling elements 26 to 29 turn the individual function chains 1 to n into local data transmission units, between which only individual status signals are transmitted.

The control command "start up" initially activates the function chain 1. It is only when the function chain 1 is in readiness that a corresponding status signal of the function chain 1 passes on the control command through the coupling element 27 to the function chain 2. In a corresponding way, the function chain 3 is only activated when the function chains 1 and 2 are ready.

FIG. 2 shows a signal flow diagram of the automatic control of a block of a power plant having an overall process being subdivided into six functional units. Function chains 1 to 6 corresponding to the functional units are hierarchically organized in a logical sequence. In this case, the individual function chains 1 to 6 are assigned the automation devices 8 executing various functions in a common automation system, in a manner corresponding to the technological structure of the plant.

In the function chain 1, which is connected upstream of the function chains 2 to 5 or is disposed at a higher level than the function chains 2 to 5, five subfunction devices 7, which are symbolized by arrows and which assume the entire number of tasks relevant for the "supply" of the plant, for example, are executed.

In the function chain 2, the functions which are relevant for the "disposal" of the plant are executed. The function chain 2 includes four subfunction devices 7, that are likewise symbolized by arrows.

In the function chain 3, control interventions which are required for the transport of waste process heat and for the return transport of condensate are automatically carried out and monitored, for example in the condenser of a water-steam cycle of a steam turbine, with the cycle including a plurality of plant components.

In the function chain 4, the required control interventions for a trouble-free "transport of process heat" are carried out in the diagrammatically represented steam-water cycle.

The function chain 5 executes the functions required for a "conversion from primary energy into thermal energy". In this case, for example, the subsystems 9 of a gas-turbine combustion chamber, which are likewise diagrammatically represented, are activated.

With the function chain 6, the subsystems 9 of plant components for the "conversion of thermal energy into electrical energy", such as individual actuating elements of a generator G, are activated.

In the illustrative embodiment according to FIG. 2, the data buses and lines 5 and 25 of FIG. 1 are symbolized by respective signal lines 5' and 25'.

When starting up the plant, a control command triggered in the master control unit 16 is passed on through a block control unit 30 to the individual function chains 1 to 6. Once the subsystems 9 assigned to the function chain 1 are activated, a control signal is transmitted from the function chain 1 to the function chain 2 and, together with the control command available at the function chain 2, activates the subsystems 9 of the function chain 2. In a corresponding way, the function chains 3 to 6 are successively activated.

When shutting down the plant, the function chains 6 to 1 are run through in the reverse sequence and the corresponding process sections are successively deactivated.

In normal operation of the plant, the subsystems 9 of the individual function chains 1 to 6 can be activated individually through the corresponding automation devices 8. The control is performed in the master control unit 16 by touching a screen 31, which is constructed as a plasma display and is disposed in a control console 32. Check-back signals, status messages and fault messages are visually displayed on screens 33, which are likewise built into the control console 32.

The overall process proceeding in the power plant can be controlled and monitored in all operating phases by just one person. Therefore, the control console 32 is constructed in the form of an arc, corresponding to a cockpit.

We claim:

1. In combination with a power plant having a plurality of mutually interacting controllable power plant components, an automatic power plant control system, comprising:

a master control unit;

a data bus connected to said master control unit; and function chains including automation devices each having a plurality of subfunction devices, said automation devices being combined into mutually independent functional units corresponding to a technological structure of the power plant, said automation devices executing various functions in an automation system shared by the power plant components, and said automation devices being connected to one another and to said master control unit by said data bus for transmitting data relevant to the power plant;

said function chains each including a common data line linking said subfunction devices and transmitting only data relevant for one functional unit; and each of said subfunction devices including a plurality of subsystems having the controllable power plant components.

2. The automatic control according to claim 1, wherein:

said function chains are linked in a predetermined sequence during a start-up operation and a shut-down operation of the plant; and said function chains are individually activatable during operation of the plant.

3. The automatic control according to claim 1, including data lines connected to said function chains, and data-selectively acting coupling elements connecting said data lines to said data bus for linking said function chains to one another and to the data bus.

4. The automatic control according to claim 1, wherein said function chains are hierarchically organized corresponding to the following logical process sequence of the plant:

a) supply, b) disposal, c) transport of waste process heat and return transport of condensate, d) transport of process heat, e) conversion of primary energy into thermal energy, and f) conversion of thermal energy into electrical energy.

* * * * *